Aug. 6, 1929.   M. J. LIDE   1,723,795
CONCENTRATING TABLE
Filed March 10, 1926   2 Sheets-Sheet 1

Inventor
MARTIN J. LIDE

Aug. 6, 1929.                M. J. LIDE                1,723,795
                       CONCENTRATING TABLE
                     Filed March 10, 1926          2 Sheets-Sheet 2
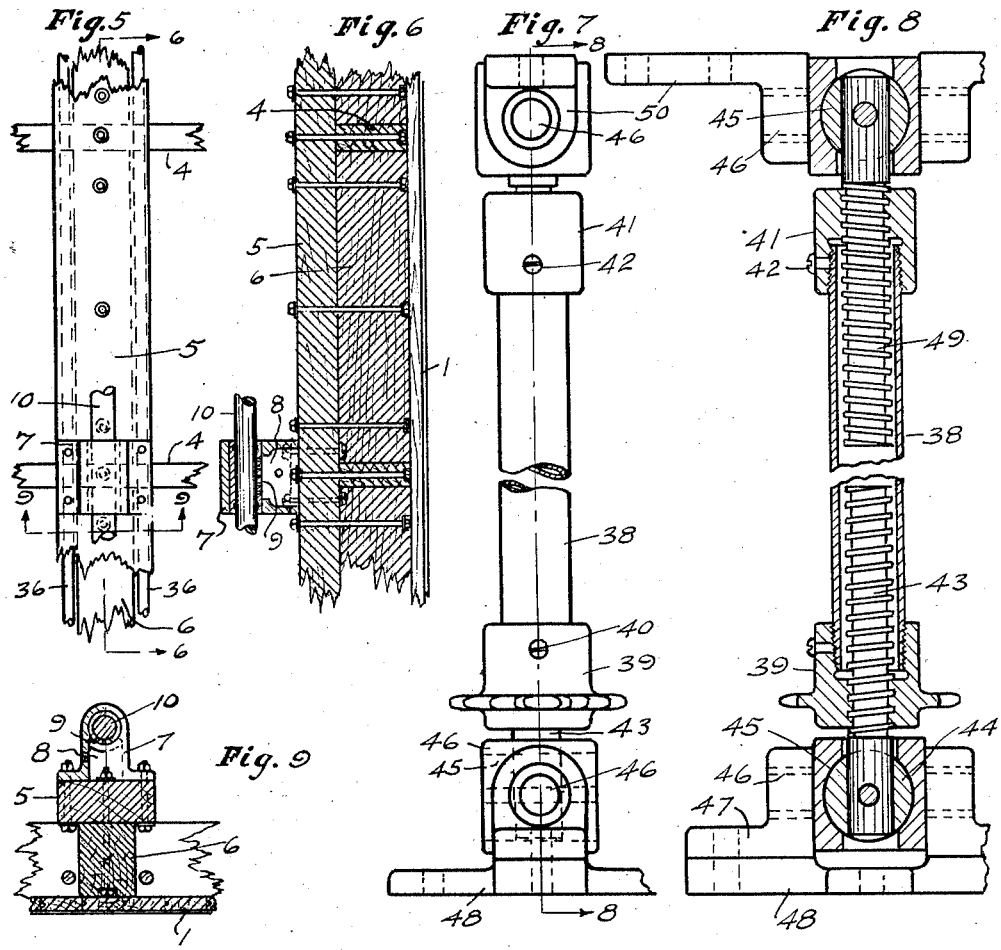
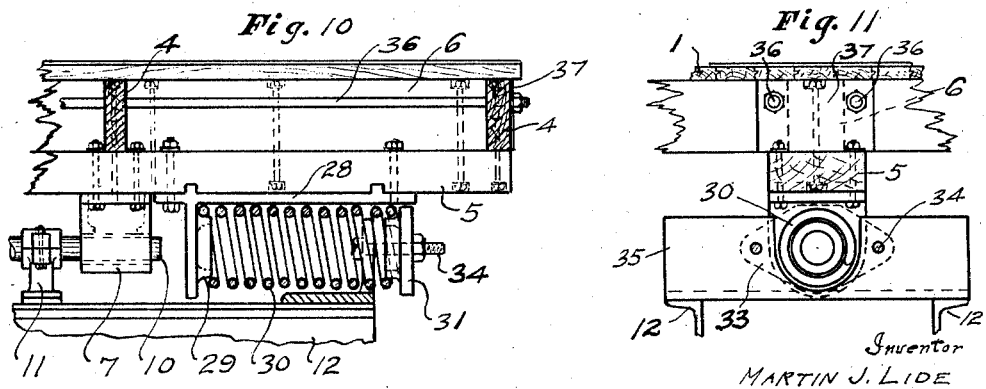
Inventor
MARTIN J. LIDE Patented Aug. 6, 1929.

1,723,795

UNITED STATES PATENT OFFICE.

MARTIN J. LIDE, OF BIRMINGHAM, ALABAMA.

CONCENTRATING TABLE.

Application filed March 10, 1926. Serial No. 93,604.

My invention relates to an improved concentrating table which is adapted, as a result of oscillatory motion imparted thereto, to effect a stratification and separation, according to the specific gravities, of material thereon.

My invention contemplates oscillating the table by mechanism adapted to impart an endwise thrust thereto in opposition to a return spring. In concentrating mechanism of this character, there are certain difficulties to be overcome in relation both to the construction and bracing of the frame work of the table as well as in the provision of means for guiding the table's oscillatory movements and varying its inclination. One distinctive feature of my invention is the construction of the table with a longitudinal central bottom thrust member or beam extending from end to end and adapted to receive the thrust strain from the operating mechanism, said member being preferably formed of a continuous bottom member carrying superposed thrust blocks which are interposed between rigid cross supports for the table and the whole held together by longitudinal tie rods disposed on each side of the thrust beam. The thrust member in effect constitutes a built up beam or truss which is tied into the cross braces so that I provide a rigid frame work for the table capable of resisting the load strains thereon without undue deflection from its normal plane at any point.

A further distinctive feature of my invention is mounting the table to slide on a longitudinal axis or shaft preferably by means of slide bearings carried by the thrust member. This manner of mounting the table lends itself to an important structural advantage in that the spring opposing the thrust mechanism for oscillating the table can be set under the table concentric with its supporting shaft, thus not interfering with the adjustment of the table to vary its inclination and being mounted where it is protected from the material on the table while yet convenient of access for adjustment.

My invention also contemplates providing the table with a plurality of adjustable leg supports on one side, which supports constitute in effect turn buckles with universal joint connections to floor and table and with a joint drive means for adjusting them simultaneously and equally when adjustment of the table is required.

My invention further comprises the novel details of construction and arrangements of parts, which are hereinafter more particularly described and pointed out in the appended claims, reference being had to the accompanying drawings which form a part of this specification, and in which:—

Fig. 5 is a bottom view of a portion of the central thrust beam carrying the slide bearings of the table.

Fig. 6 is a sectional view on the line 6—6 of Fig. 5.

Fig. 7 is an enlarged detail view, broken away, of one of the adjustable rocking table legs.

Fig. 8 is a cross-sectional view taken on the line 8—8 of Fig. 7.

Fig. 9 is a cross-sectional view taken on the line 9—9 of Fig. 5.

Fig. 10 is a detail view of the thrust spring rig for the table.

Fig. 11 is an end view of Fig. 10 with the outer spring seat shown in dotted lines.

Similar reference numerals refer to similar parts throughout the drawings.

Figure 1:
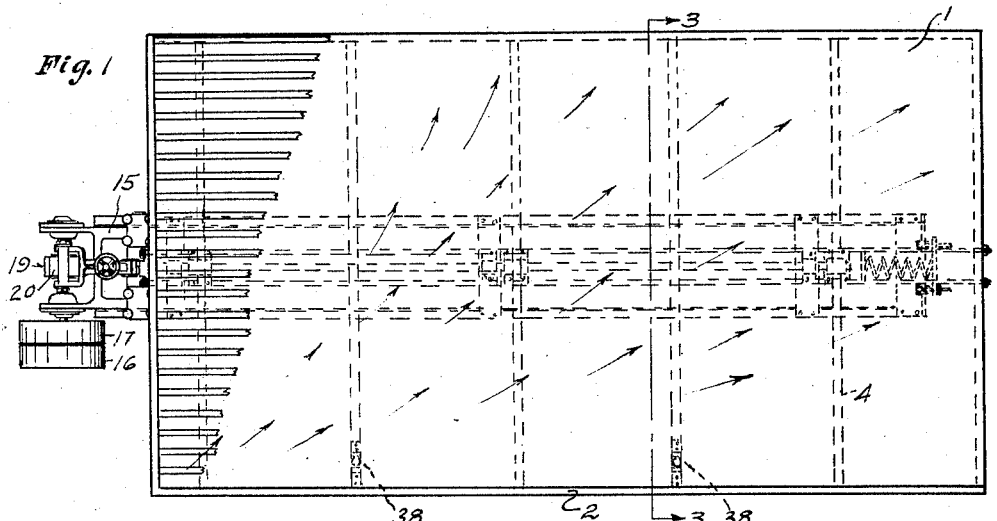
Fig. 1 is a plan view of my improved concentrating mechanism with the riffles only partly shown to avoid confusion.
Figure 2:
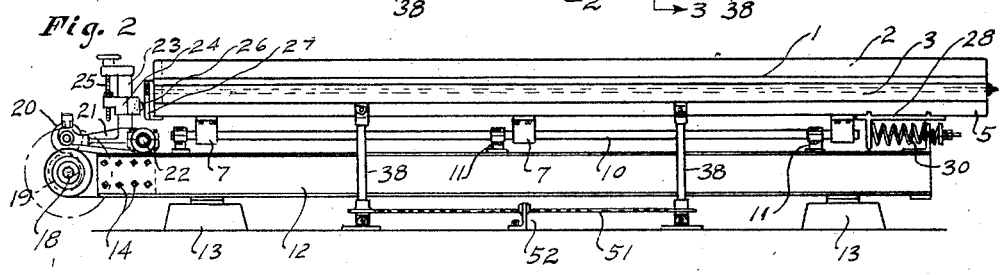
Fig. 2 is a side view of Fig. 1.
Figure 3:
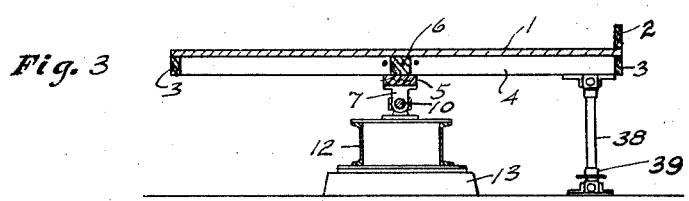
Fig. 3 is a sectional view on the line 3—3 of Fig. 1.
Figure 4:
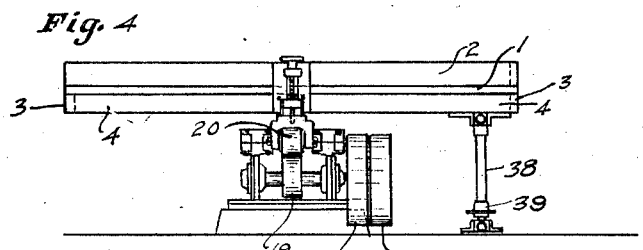
Fig. 4 is an end elevation of the table.

In the embodiment of my invention illustrated in the drawings, I show conventionally a concentrating table 1, which may be of any suitable type, wet or dry, plain or riffled, and to which the material to be treated is supplied at one corner and traverses the table in the direction of the arrows shown in Fig. 1, the heavier matter being separated from the lighter matter and the separated material discharged from one side and end of the table. The table along the other end and side away from which the material moves is provided with a top border strip 2 and has an apron 3 attached beneath and surrounding all four edges. As shown, the table frame work comprises continuous rigid cross beams 4 which are bolted at their centers to a longitudinal central bottom beam 5. Thrust blocks 6 are mounted on and bolted to this beam 5 and interposed between the cross beams 4. I bolt to the underside of the longitudinal central beam 5 a plurality of slide bearings 7, each formed with an oil or lubricating reservoir 8 that has access through perforations 9 to its respective bearing. These bearings are mounted to slide on a fixed axis or shaft 10 which in turn is mounted by means of clamp brackets 11 upon the main base or support for the table, which, as shown, comprises a pair of parallel channels 12 which are anchored to foundations 13 near their ends. These channels at one end are connected by bolts 14 to the frame 15 of the table driving mechanism and which may herein be briefly described as comprising a loose pulley 16 and a fast pulley 17 on a drive shaft 18 upon which a cam 19 is mounted and adapted to engage a roller 20 carried by a bell crank rocker 21 mounted on a shaft 22 and having an upright arm 23 upon which a cross head 24 is mounted for adjustment by means of a screw 25. The cross head carries a thrust roller 26 co-acting with a thrust plate 27 which is attached to the center of the adjacent end of the table and to one end of the longitudinal beam 5. The mechanism thus described in connection with an opposing spring will impart oscillatory movements to the table to reciprocate it on the axis 10.

To oppose the cam drive for the table, I provide a spring rigging shown more clearly in Fig. 10, and which comprises an angled bracket 28 bolted to the underside of the thrust beam 5 near its far end and providing one seat 29 for a coil spring 30, which at its other end engages an adjustable seat 31 having side flanges or ears 33 which are adjustably connected by means of bolts 34 to an angle 35 which is cut away at its center for the passage of the spring 30 therethrough (see Fig. 11), and which in turn is suitably bolted or attached to the base channels 12. To further brace the table I provide a pair of tie rods 36 which at one end engage the thrust plate 27 and which extend lengthwise of the table through the several cross beams 4 and at their other ends engage a plate 37 disposed on the outer side of the end cross beam 4.

The table as thus far described, is supported loosely by means of its slide bearings 7 on the central axis or shaft 10 on the frame 12, the whole constituting a built up beam or truss. To provide for the lateral inclination of the table about the axis 10, I provide near the upper side edge of the table a plurality of adjustable legs, two being shown in the drawings. Each leg comprises a pipe 38 which at its lower end is screwed into a cupped sprocket 39 which is held against rotation on the pipe by a set screw 40. At its upper end the pipe is screwed into a round nut 41 which is held against rotation thereon by a set screw 42. A screw 43 is screwed up through the sprocket 39 into the lower end of the pipe 38 and at its lower end the shank of the screw is inserted through and made fast in a cylindrical member 44 which is mounted to rock in a cylindrical bearing 45 provided with trunnions 46 disposed at right angles to the long axis of the cylindrical member 44. These trunnions are mounted to rock in bearings 47, and the bearings 45 and 47 are bolted to a base 48 which in turn is bolted to the floor or support. This permits the leg at the lower end to have universal motion and any equivalent bearing may be substituted for that shown. A screw 49 is screwed downwardly through the nut 41 into the upper end of the pipe and the shank of this screw is mounted similarly to the shank of the screw 43 to a bearing bracket 50, corresponding to the bearing 47, which bracket is adapted to be bolted directly to the underside of the table. The threads on the screws 43 and 49 have reverse pitches. The sprockets 39 for the two legs are connected by means of the sprocket chain 51 for joint and corresponding motion so that, having once adjusted the table to the desired inclination, its supporting legs can be simultaneously lengthened or shortened to vary the tilting adjustment as required. A support 52 is provided for the long sprocket chain.

It will be noted that these legs are provided at one side of the table and are detached from the main supports for the table. This produces a very simple and inexpensive manner of mounting the table.

In operation, having assembled and mounted the table in the manner described, upon starting up the drive the cam 19 will actuate the bell crank rocker which will impart longitudinal thrust to the table, causing it to slide by means of its bearings 7 on the axis 10, which motion will be resisted by the action of the coil spring 30 which tends to return the table. By the mechanism just described the table is given longitudinal oscillations, the extent and rapidity of which are controllable by the adjustment of the cross head 24 and the R. P. M. of the cam. As the table is thus longitudinally oscillated the legs 38 will rock about their lower universal bearings and follow the table. When a change in the tilting of the table is required the chain 51 is operated and both turn buckle legs are turned and screwed up or down upon the screws 43 and 49 to adjust their length.

Though I have described with great particularity the details of the embodiment of the invention herein shown, it is not construed that I am limited thereto, as changes in arrangement and substitution of equivalents may be made by those skilled in the art without departing from the invention as defined in the appended claims.

Having thus described my invention, what

I claim as new and desire to secure by Letters Patent, is:—

1. A concentrating table, comprising a rigid framework composed of continuous parallel cross beams, a continuous longitudinal beam tied to the cross beams, thrust blocks substantially equal in depth to the cross beams and interposed between the cross beams, means securing the thrust blocks to the longitudinal beam, sliding supports for the table in part carried by the longitudinal beam, and means to reciprocate the frame longitudinally.

2. A concentrating table comprising a longitudinal supporting base disposed centrally under the table, a shaft mounted fast above said base and parallel therewith, structural beams extending transversely of the table, thrust blocks interposed between said beams and substantially equal in depth to said beams, a thrust beam mounted underneath said thrust blocks and transversely extending beams and attached thereto, slide bearings mounted under the thrust beams and riding on the shaft, a drive mechanism connected to said supporting base and acting against the thrust beam to move the table in one direction, and a spring cooperating between the supporting base and the thrust beam to return the table against said thrust.

3. Apparatus as set forth in claim 2 wherein rods extend longitudinally of the table through the transverse beams and draw the transverse beams and thrust blocks together.

4. A concentrating table comprising a longitudinal supporting base disposed centrally under the table, a shaft mounted fast above said base and parallel therewith, structural beams extending transversely of the table, thrust blocks interposed between said beams and substantially equal in depth to said beams, a thrust beam mounted underneath said thrust blocks and transversely extending beams and attached thereto, slide bearings mounted under the thrust beam and riding on the shaft, a drive mechanism connected to said supporting base and acting against the thrust beam to move the table in one direction, a spring concentric with the shaft, a spring seat for one end of the spring and secured to the thrust beam, and a seat for the other end of the spring adjustably connected to the supporting base.

5. Apparatus as set forth in claim 4 wherein the adjustable connection consists of a slotted angle bar mounted crosswise of the supporting base and partly embracing the spring, a movable spring seat adjacent the angle bar, and bolts connecting the spring seat to the angle bar.

In testimony whereof I affix my signature.

MARTIN J. LIDE.